J. B. CASTLE.
CRANKING MEANS FOR AUTOMOBILES.
APPLICATION FILED SEPT. 7, 1909.

991,135.

Patented May 2, 1911.

3 SHEETS—SHEET 1.

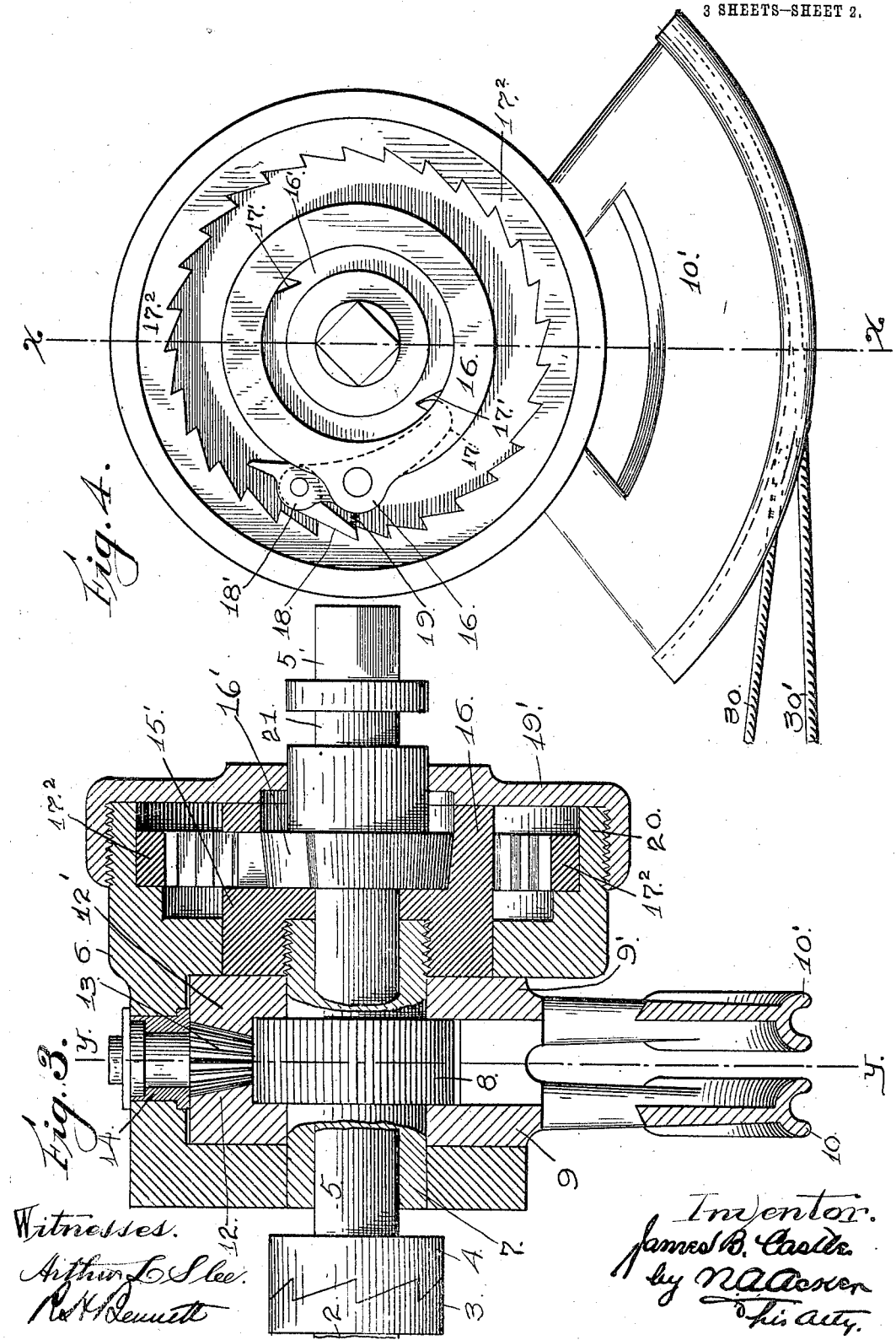

J. B. CASTLE.
CRANKING MEANS FOR AUTOMOBILES.
APPLICATION FILED SEPT. 7, 1909.

991,135.

Patented May 2, 1911.

3 SHEETS—SHEET 3.

Witnesses.
Arthur L. Slee
Rob't Bennett

Inventor.
James B. Castle.
by N. A. Acker
His Atty.

UNITED STATES PATENT OFFICE.

JAMES B. CASTLE, OF SAN FRANCISCO, CALIFORNIA, ASSIGNOR OF ONE-HALF TO ROBERT S. MOORE, OF SAN FRANCISCO, CALIFORNIA.

CRANKING MEANS FOR AUTOMOBILES.

991,135.  Specification of Letters Patent.  Patented May 2, 1911.

Application filed September 7, 1909. Serial No. 516,321.

*To all whom it may concern:*

Be it known that I, JAMES B. CASTLE, a citizen of the United States, residing in the city and county of San Francisco and State of California, have invented certain new and useful Improvements in Cranking Means for Automobiles, of which the following is a specification.

The hereinafter described invention relates to cranking means capable of being actuated by the driver of an automobile from his seat within the machine, thereby enabling the crank shaft to be operated or rotated to place into commission the motor of the car without requiring the driver to leave his seat, thus avoiding the annoyance of having to leave the car for the purpose of cranking the machine.

The device consists essentially of an operating lever located adjacent the seat of the driver so as to be in convenient reach of the hand, with suitable connections for converting the reciprocating movement of the said lever into a rotary motion of the crank shaft for operating the engine, the connections being of such a character as to impart rotation to the crank shaft on movement of the operating lever in either direction.

Additionally, the invention also comprises means to be hereinafter more fully explained for taking up the strains which otherwise would be placed onto the cranking mechanism in case of a back explosion or firing of the engine during the cranking operation of the machine, thereby preventing a rupture or breakage of the working parts which otherwise would occur.

To comprehend the invention, reference should be had to the accompanying sheets of drawings wherein—

Figure 1:
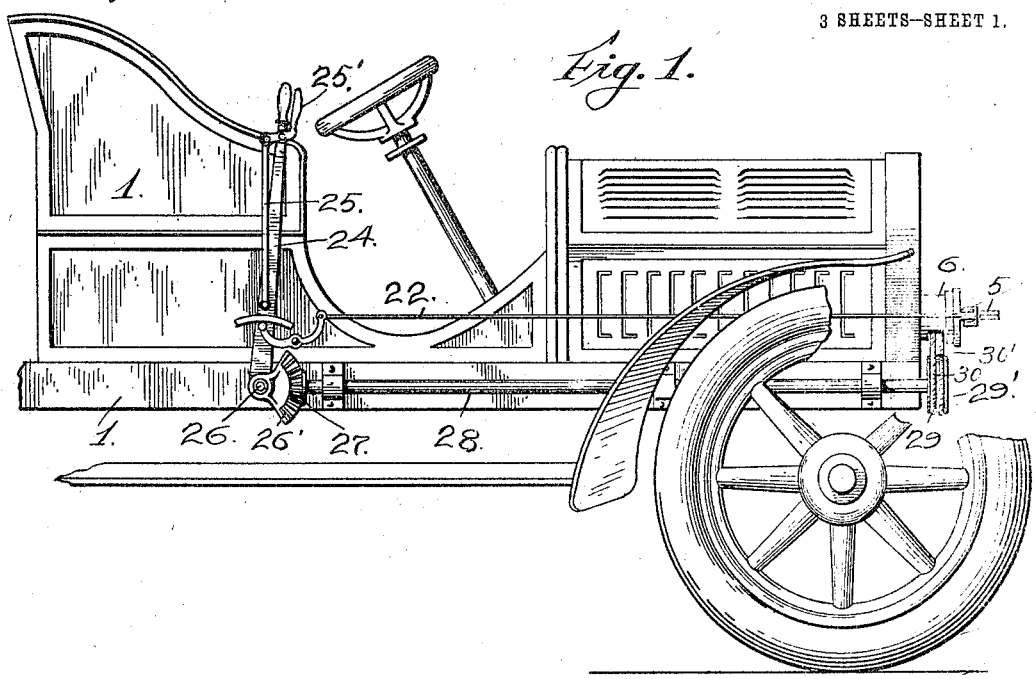
Figure 2:
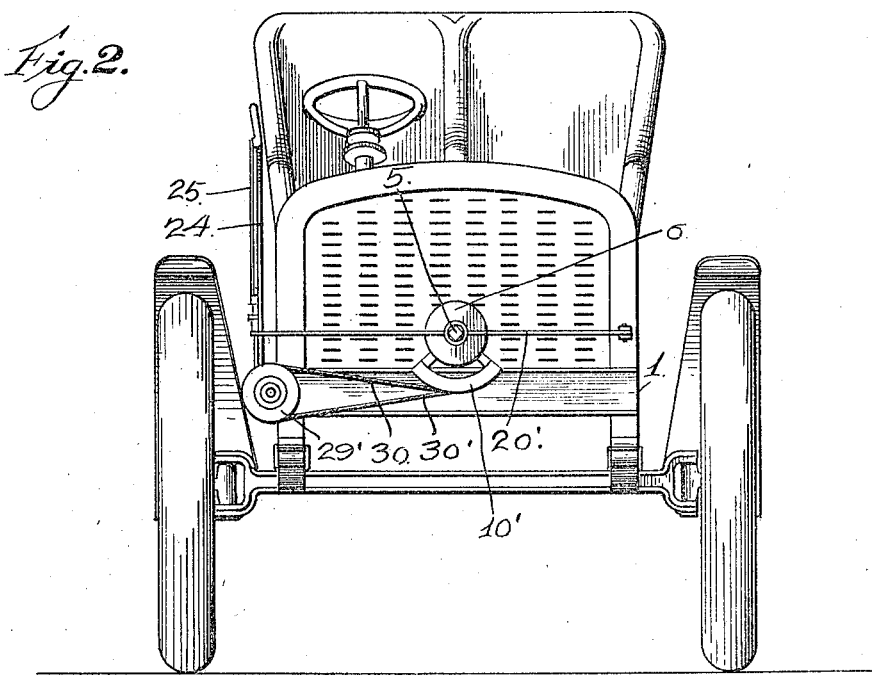
Figure 5:
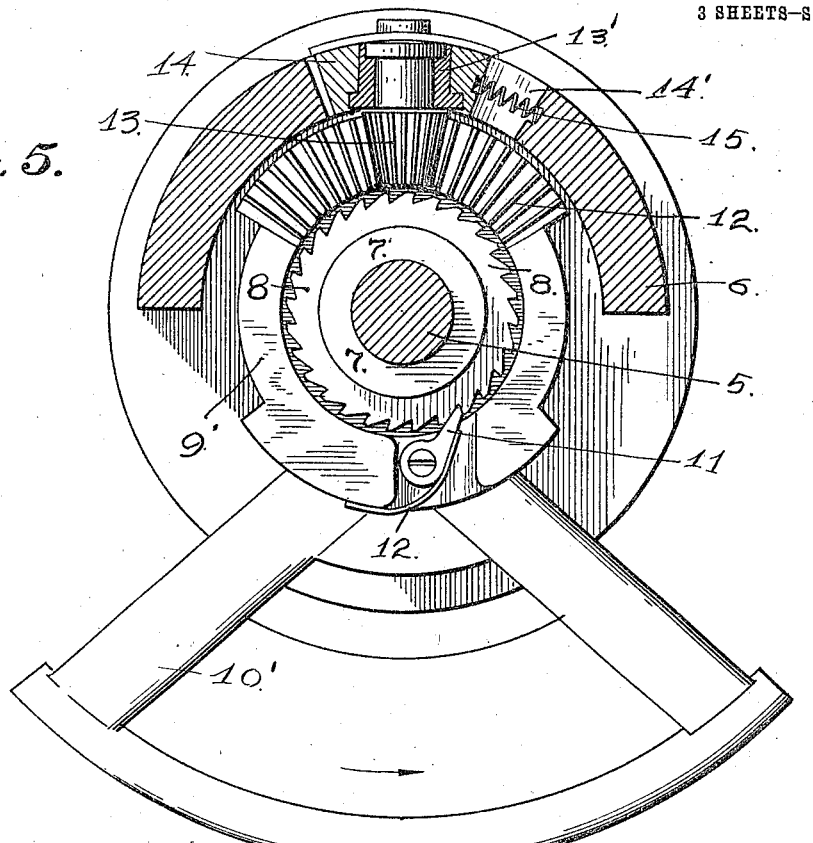
Figure 6:
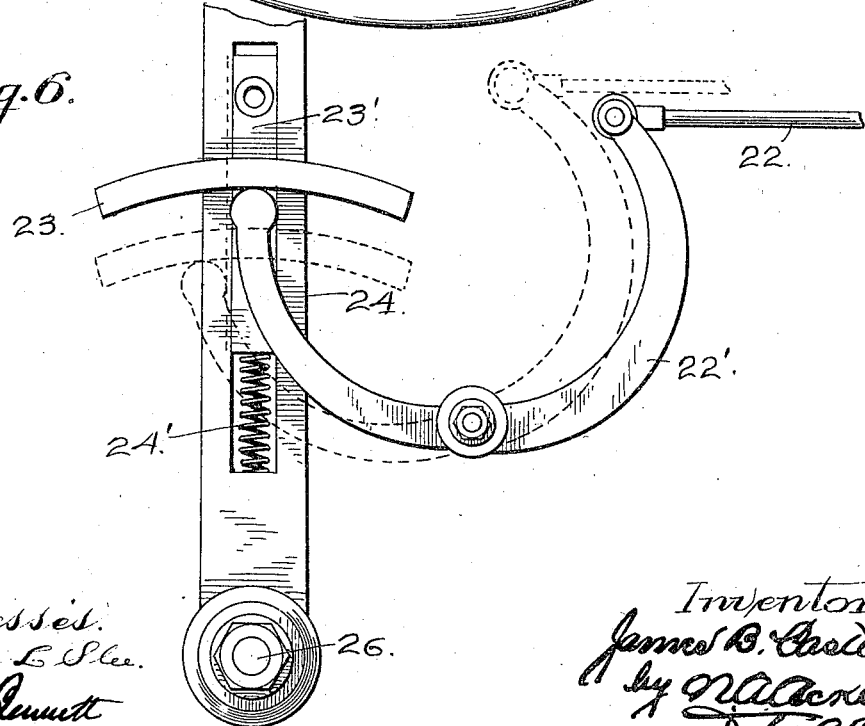

Figure 1 is a broken side elevation of an ordinary gasolene automobile with the improved cranking means applied thereto. Fig. 2 is a front view of the machine, illustrating in part the connection between the crank shaft and the operating lever, also the means for moving inwardly the said crank shaft to place its inner end in clutch engagement with the engine shaft, and the connections for imparting rotation to said crank shaft. Fig. 3 is an enlarged detail longitudinal sectional view taken on line *x—x*, Fig. 4 of the drawings, the said view disclosing the casing or shell for the working parts, the crank shaft extended therethrough and the connection between the said crank shaft and the transmitting and driving means for imparting rotation thereto, the said shaft being illustrated in clutch engagement with the engine shaft. Fig. 4 is a front elevation of the casing or shell containing the transmitting mechanism and through which extends the crank shaft, the face or cover plate of the casing being removed to illustrate the drive connection between the transmitting mechanism and the said crank shaft, also the means for releasing said drive connection on a back explosion taking place to disconnect the crank shaft. Fig. 5 is a vertical sectional view taken on line *y—y* of Fig. 3 of the drawings, illustrating one of the reciprocating sectors and its connections for imparting rotary motion to the crank shaft. Fig. 6 is an enlarged detail view of the actuating means for throwing the hinged cross rod for forcing inwardly the crank shaft to place the same in clutch engagement with the engine shaft, the said hinged cross rod being illustrated in Fig. 2 of the drawings, the depressed position of the parts being illustrated in dotted lines.

Referring to Figs. 1, 2 and 3 of the drawings, the numeral 1 is used to designate any suitable form of a gasolene driven automobile, and 2 the engine shaft located beneath the body thereof, which shaft carries at its forward end a clutch member 3, with which engages the clutch member 4 of the crank shaft 5, when the said crank shaft is forced inwardly for the cranking of the engine.

Preferably, at the front of the car or automobile is situated a crank casing or shell 6, more fully understood by reference to Figs. 3, 4 and 6 of the drawings. Through this casing or shell 6 extends the crank shaft 5, on which is loosely mounted within the main body of the casing or shell 6 the sleeve 7, Figs. 3 and 5 of the drawings, which sleeve is formed with the ratchet ring extension 8. On the sleeve 7 is loosely mounted, at each side of the ratchet ring extension 8, the hubs 9—9', from which depend the sector extensions 10—10', each of the hubs 9—9' being locked to the said ring extension 8 against movement in one direction by means of a pawl 11, held into engagement with the teeth of the said ring by the spring 12, Fig. 5 of the drawings. Only one of said pawls 11 is shown, but it will be understood that a pawl is carried by each of the hubs 9—9'. The hubs 9—9' are held apart or separated by means of the ratchet ring extension 8, and each of the said hubs at their upper portion carry the rack segments 12—12', between and in mesh with which works the bevel pinion 13, which is mounted in a bearing 13' of a block 14, slidably mounted in a cut away portion 14' of the upper portion of the casing or shell 6, and which block is held normally in position by the spring 15.

The sleeve 7 screws into a cylindrical head 15', loosely fitted within the centrally contracted portion of the casing or shell 6, the overhang 16 of which head encircles the enlarged portion 16' of the crank shaft 5, Figs. 3 and 4 of the drawings, and carries a pivoted dog 17 that engages with one of the notches 17' in the face of the enlarged portion 16' of the said crank shaft, in order to hold the parts locked together so as to transmit the rotary movement of the head 15' to the crank shaft. Within the enlarged outer portion of the casing or shell 6, in which is located the extended or overhang portion 16 of the head 15', is snugly fitted the rack ring $17^2$, the teeth of which are engaged by a pawl 18 pivoted to the projecting head end 18' of the pivoted dog 17, the lower inwardly projecting end of which dog is held into engagement with one of the notches 17' of the enlarged portion 16' of the crank shaft 5. The said pawl 18 is held normally outwardly pressed by means of the spring 19, which is interposed between the said pawl and the head portion of the dog 17.

The outer or forward end portion of the crank-shaft 5 is extended through an aperture formed in the cap or cover plate 19', which cap or cover plate is screwed onto the exteriorly screw-threaded portion 20 of the casing or shell 6, the said cap or cover plate bearing against the forward end of the overhang or extended portion 16 of the head 15', and holding the same and its associated parts in proper position. The crank shaft 5 is permitted slight longitudinal movement within the casing or shell, sufficient to place its clutch member 4 into and out of clutch engagement with the clutch member 3 of the engine shaft 2. The said crank shaft is forced inwardly to place its clutch member 4 into engagement with the clutch member 3 of the engine shaft 2 by means of the shifting rod 20', hinged at one side to the front of the car, Fig. 2 of the drawings. This shifting rod is extended across the front of the machine, fitting within the circular groove 21 formed in the projecting end portion of the crank shaft 5, and the free end of said rod is hinged to a longitudinally disposed draw rod 22, arranged at one side of the car, Figs. 1, 2 and 6 of the drawings.

At its inner end this draw rod is hinged to one arm of a curved crank lever 22', which is pivoted to the side of the car. The opposite arm of said crank lever is situated in line with a curved or segment shoe 23, carried by a vertically movable block 23', working in guides of a lever 24, and normally upheld by means of a spring 24', Fig. 6 of the drawings. To the slide block 23' is connected a link 25, the upper end of which is secured to the lower arm of a crank lever 25', pivoted to the lever 24 adjacent the upper end thereof, Fig. 1 of the drawings. Under this construction, as the upper arm of the crank lever 25' is drawn inwardly, the lower arm thereof is thrown downwardly, carrying therewith the link 25 and forcing downwardly the slide block 23' and its shoe 23, causing the shoe 23 to engage the free end of the pivoted crank lever 22', which is carried therewith. As the crank lever 22' is thus swung on its pivotal point, an inward pull is exerted on the draw rod 22, causing the hinged shifting rod 20' to swing inwardly and force the crank shaft within the casing or shell 6, until its clutch member 4 is placed into engagement with the clutch member 3 of the engine shaft 2, Fig. 3 of the drawings. The parts are then positioned for imparting rotation to the crank shaft, to actuate the engine shaft.

The hand lever 24, which is located so as to be within convenient reach of the driver of the machine or car, Figs. 1 and 2 of the drawings, is employed for the purpose of operating the crank shaft to crank the engine of the car. This lever at its lower end is connected to the frame of the car by means of a short rock shaft 26, which carries a segment gear 26', with which meshes a pinion 27, on the inner end of a longitudinally disposed shaft 28, working in bearings on the frame of the car. The said shaft 28 projects a slight distance beyond the front of the car, and has secured on the projecting end thereof the grooved pulley wheels or sheaves 29—29', to which are attached respectively the cords or chains 30—30', the free ends of which are connected to the sectors 10—10' projecting below the casing or shell 6, and which sectors extend through and work within the removed or cut away section of the bottom portion of the said casing or shell, Fig. 5 of the drawings. As the hand lever 24 is thrown forwardly, the movement thereof is transmitted for imparting rotation to the shaft 28 by means of the intermeshing segment gear 26' and pinion 27. The motion thus transmitted to the shaft 28 throws the pulley wheels 29—29', to wind one of the chains or cords 30—30' and unwind the opposing or companion one, which acts to exert a pulling strain on one of the sectors—say sector 10' and release its companion sector 10. As sector 10' is drawn over in the direction of the arrow, Fig. 5 of the drawings, its hub 9' is rotated and carrying therewith the quadrant rack 12' imparts rotation to the pinion 13, which pinion coacting with the companion quadrant rack 12, throws the same and its hub 9 and depending sector 10 in an opposite direction to that imparted to the sector 10' and its associate parts. During this stroke or throw of the sector 10', its pawl 11 being in locked engagement with the ratchet ring 8 of the sleeve 7, imparts rotation to the said ring 8 and to the head 16 carried thereby, which, in turn, through the medium of the engaging dog 17, transmits rotation or rotary motion to crank shaft 5, which, being in clutch with the engine shaft 2, operates to impart rotation to the said shaft of the engine for the cranking thereof. On the hand lever 24 being thrown rearwardly, a reverse rotation is transmitted to the shaft 28 and the pulleys 29—29', which winds the chain or cord 30, to exert a pulling strain on the sector 10 and release the chain or cord 30'. During this rotation of the shaft 28, the sector 10 is thrown in an opposite direction to that previously described, its hub 9 turning therewith, and the quadrant rack 12 actuating the pinion 13 to impart an opposite throw to the quadrant rack 12', the pawl of its hub 9' slipping over the teeth of the ratchet extension 8. On this stroke of the quadrant rack 12, the pawl 11 of its hub 9 is in locked engagement with the said extension 8, the motion thereof being transmitted to impart rotation to the said ratchet and its sleeve portion 7, and to the head 15 carried thereby, which acts to impart rotation to the crank shaft as previously described. Thus, with each reciprocating stroke of the hand lever 24, motion is transmitted for imparting rotation to the crank shaft 5, the position of the sectors 10—10', and their associate parts varying with respect to one another, on each stroke of the said hand lever. The sectors 10—10' and their associate parts may be considered and treated as sectionized transmitting mechanism, the pinion 13, the shifting means for positioning the opposing sections of the transmitting mechanism, and the ratchet 8, sleeve 7, head 15' and dog 17 as the drive mechanism for the crank shaft 5.

During the operation of cranking a car, it frequently happens that a back explosion or firing of the engine takes place, which throws the crank shaft suddenly in an opposite direction. To take care of this "back kick" and prevent injury resulting to the cranking mechanism, the pawl 18, Fig. 4 of the drawings, is provided, which pawl acts to automatically release the dog 17 from locked engagement with the section 16' of the crank shaft 5, the same operating in the following manner:—As the strain of the engine shaft is thrown onto the crank shaft 5 on a back explosion occurring, a pull is exerted on the dog 17, tending to rotate the head 16 in an opposite direction to that imparted thereto during the cranking operation. Inasmuch as the head of the dog 17 is held against reverse rotation by being locked to the immovable rack ring 17² by the pawl 18, the strain exerted thereon is transferred onto the said pawl 18, which acts as a lever to gradually force inwardly the head end of the pivoted dog 17 and removes its lower end from locked engagement with the notched portion of the section 16' of the crank shaft 5, thus releasing the same. However, as a slight reverse movement is transmitted to the working parts immediately prior to the release of the dog 17, such "back lash" must be taken care of, else the initial strains falling onto such parts, if held immovable, would tend to rupture the same. This "back lash" is taken care of by permitting a slight movement or play to fall onto the slide block 14, which is slidable in the opening 14' of the casing or shell 6, Fig. 5 of the drawings, the movement of which is resisted under normal working conditions by means of the spring 15. The slight play or give thus permitted the interlocked working parts, allows for the "back lash" occasioned by a back fire or explosion of the engine without rupture to the working parts, inasmuch as the lock connection with the crank shaft is broken or destroyed automatically by the reverse strains placed onto the dog 17. On the cranking of the engine of the car, the clutch member 4 of the crank shaft 5 is gradually forced outwardly to release the said shaft from clutch engagement with the clutch member 3 of the engine shaft 2. This movement of the crank shaft throws forwardly the hinged shifting rod 20' and pulls forwardly the draw rod 22, while at the same time the pressure of the spring 24' raises the slide block 23', to restore the link 25 and crank lever 25' to normal position.

I am aware that changes may be made in the various working parts herein described for the carrying out of the invention and this without creating a departure therefrom, and therefore I do not wish to be understood as limiting myself to the construction and arrangement of coacting working parts illustrated in the drawings accompanying the filing of the present application.

Having thus described the invention and the construction of working parts for successfully carrying out the same, what is claimed as new and desired to be protected by Letters Patent is:—

1. In an automobile, the combination with the shaft for cranking the engine, a pivoted hand lever located adjacent the driver's seat, drive mechanism under the control of the hand-lever for imparting rotation to the cranking shaft on each stroke of the hand lever, a lever adjacent the driver's seat for imparting longitudinal movement to the crank shaft for placing the same into clutch engagement with the engine shaft and means for automatically disconnecting the cranking shaft from the drive mechanism on a back explosion of the engine.

2. In an automobile, the combination with a cranking shaft having a limited longitudinal movement, a clutch member carried by the inner end thereof for engagement with the clutch member of an engine shaft, means operatable from a position adjacent the driver's seat of the automobile for shifting inwardly the cranking shaft to place the same into clutch engagement with the shaft of the engine to be cranked, and mechanism for automatically disconnecting the crank shaft from its drive means on a back explosion of the engine.

3. In an automobile, the combination with a cranking shaft having a limited slidable movement, a draw rod for moving the same inwardly, connection between said rod and the cranking shaft, a pivoted crank lever for operating the draw rod, hand controlled mechanism for swinging said crank lever to inwardly move the draw rod, and tension means for restoring the hand controlled mechanism to normal position.

4. In an apparatus for the described purpose, the combination with a crank shaft, a shell or casing through which the same works, a plurality of oppositely movable gear or rack members arranged within the casing, a pinion intermeshing therewith, a ratchet loose on the crank shaft and with which said members are held in locked engagement against relative movement in one direction, connections between the loose ratchet and the crank shaft for imparting rotation thereto, and means controlled from the driver's seat of an automobile for actuating gear or rack members to impart rotation thereto.

5. In cranking means for gasolene cars, the combination with a supporting shell or casing, a crank shaft working therein, a sleeve within the casing through which the said shaft extends, a ratchet section on said sleeve, oppositely movable drive members for imparting rotation to the sleeve through its ratchet section, connection between the said sleeve and the crank shaft to impart rotation thereto, and means controlled from the body of the car adjacent the driver's seat for actuating the drive members to rotate the crank shaft.

6. In cranking means for gasolene cars, the combination with a supporting shell or casing, a crank shaft extended therethrough, oppositely movable rack members working within the casing, a pinion interposed between said members and meshing therewith, a spring held slide block for said pinion, connection between the rack members and the crank shaft for imparting rotation thereto, and means controlled from the body of the car adjacent the driver's seat for actuating the rack members.

7. In cranking means for gasolene cars, the combination with a suitable shell or casing, a slidable crank shaft working therethrough, a clutch member carried thereby, for engaging the clutch member of the shaft of an engine to be cranked, drive means within the casing for imparting rotation to the crank shaft, devices controlled from the body of the car for placing the crank shaft in clutch with the engine's shaft, mechanism controlled from the body of the car adjacent the driver's seat for imparting motion to the drive means, and means for automatically disconnecting the crank shaft from the drive means on a back explosion of the engine being cranked.

8. In a gasolene car, the combination with a casing or shell, a crank shaft extended therethrough and rotatable therein, sectors extended below the casing, a longitudinally disposed rock shaft, connections between said shaft and the sectors for alternately exerting a pulling strain thereon, means within the casing for shifting one of the sectors in an opposite direction to that in which the companion sector is moved by the rock shaft, mechanism acted on within the casing for imparting rotation to the crank shaft on each throw of the sectors by rock shaft, and a hand operated lever adjacent the driver's seat for actuating the rock shaft.

In testimony whereof I have signed my name to this specification in the presence of two subscribing witnesses.

JAMES B. CASTLE.

Witnesses:
  N. A. ACKER.
  D. B. RICHARDS.